United States Patent [19]

Staerzl

[11] 4,349,000
[45] Sep. 14, 1982

[54] CONTROL MEANS FOR FUEL INJECTION IN AN INTERNAL COMBUSTION ENGINE

[75] Inventor: Richard E. Staerzl, Fond du Lac, Wis.

[73] Assignee: Brunswick Corporation, Skokie, Ill.

[21] Appl. No.: 151,623

[22] Filed: May 20, 1980

Related U.S. Application Data

[63] Continuation-in-part of Ser. No. 120,467, Feb. 11, 1980.

[51] Int. Cl.³ .............................................. F02B 3/00
[52] U.S. Cl. ................................. 123/491; 123/179 L
[58] Field of Search .................. 123/491, 179 L, 478, 123/441, 462, 463, 464, 478

[56] References Cited

U.S. PATENT DOCUMENTS

| | | | |
|---|---|---|---|
| 3,971,354 | 7/1976 | Lachaco et al. | 123/179 L |
| 3,982,503 | 9/1976 | Keranen | 123/179 L |
| 4,069,795 | 1/1978 | Long et al. | 123/491 |
| 4,089,317 | 5/1978 | Drews et al. | 123/179 L |
| 4,132,210 | 1/1979 | Long | 123/179 L |
| 4,200,063 | 4/1980 | Bowler | 123/478 |
| 4,208,991 | 6/1980 | Reddy | 123/491 |

FOREIGN PATENT DOCUMENTS

2315615  1/1977  France ................. 123/491

Primary Examiner—Raymond A. Nelli
Attorney, Agent, or Firm—Hopgood, Calimafde, Kalil, Blaustein & Judlowe

[57] ABSTRACT

The invention contemplates an electronic control unit in the form of a square-wave generator to serve the function of throttle and enrichment control in a fuel-injected internal-combustion engine. The only input manual control is a "throttle" displacement, and the output is an appropriately timed succession of square-wave pulses, of width (in terms of crankshaft rotation) which currently reflects computed evaluation of inlet-air temperature and pressure, engine speed, and start-up vs. running condition of the engine.

8 Claims, 11 Drawing Figures

CONTROL MEANS FOR FUEL INJECTION IN AN INTERNAL COMBUSTION ENGINE

BACKGROUND OF THE INVENTION

This application is a continuation-in-part of my copending application, Ser. No. 120,467, filed Feb. 11, 1980.

Said copending appliction is particularly described in connection with internal-combustion engines of the two-cycle variety, wherein fuel-injection is made directly into the crankcase region, and wherein certain economies and design simplifications are achievable through utilization of the same injector-control pulse to satisfy the injector requirements of a plurality of the cylinders of the engine. At the same time, particular pulse-width modulating circuitry was descriabed for implementing the control of fuel injectors in such engines, but the control circuitry has application to engines other than those of the two-cycle variety.

Further, it is observed that in such engines as are destined for outboard-motor marine application, a start-up problem exists by reason of past thinking which has tended to adopt the automatic-choke approach of the automobile industry. Such an approach relies upon temperature sensing of the engine block as the basis for initial fuel-enrichment control, but this approach necessarily involves the relatively great warm-up time attributable to thermal inertia of the mass of the engine block; this is a factor of more importance, in context of the great range of ambient temperatures to which automotive engines are exposed, as compared with the lesser importance of this factor for the case of outboard motors, in that outboard motors are never expected to function over anything like the automotive range of ambient temperatures.

BRIEF STATEMENT OF THE INVENTION

It is an object of the invention to provide improved electronic control means for the injectors of a fuel-injection, multiple-cylinder internal-combustion engine.

It is another object to provide such control means, with suitability for application to either two-cycle or four-cycle engines.

It is a specific object to provide improved means, associated with such electronic control means, for automatically causing transient enrichment of fuel supplied to an engine, upon engine-starting.

Another specific object is to accomplish the foregoing object effeciently and rapidly for the case of an outboard motor.

A further specific object is to achieve transient fuel-enrichment control of an outboard motor, the same to be automatically reduced to zero in a matter of seconds, and the magnitude of the enrichment to be a function of sensed inlet manifold temperature at start-up.

It is a general object to achieve the above objects with basically simple electronic components, lending themselves to compact rugged packaging of multiple electrically performed functions, with simple flexible-lead input and output connections.

The invention achieves the foregoing objects and other fearures by providing an electronic control unit in the form of a square-wave generator to serve the function of throttle and enrichment control of solenoid-operated fuel-injectors in an internal-combustion engine. The only input manual control is a "throttle" displacement, and the output is an appropriately timed succession of square-wave pulses, of width (in terms of crankshaft rotation) which currently reflects computed evaluation of inlet-air temperature and pressure, engine speed, and start-up vs. running condition of the engine.

DETAILED DESCRIPTION

In conjunction with the accompanying drawings, the invention will be described in detail in the context of an illustrative one of the two-cycle embodiments of said pending application, and with brief reference to use of the invention in a four-cycle-context. In said drawings.

Figure 1:
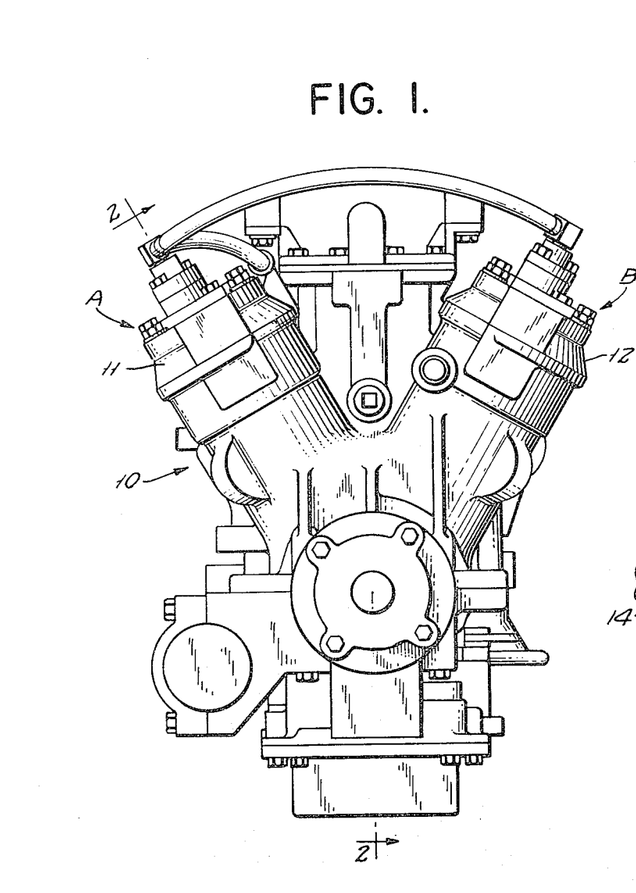
FIG. 1 is an end-elevation view of a V-6 two-cycle outboard engine in which the invention is embodied.
Figure 2:
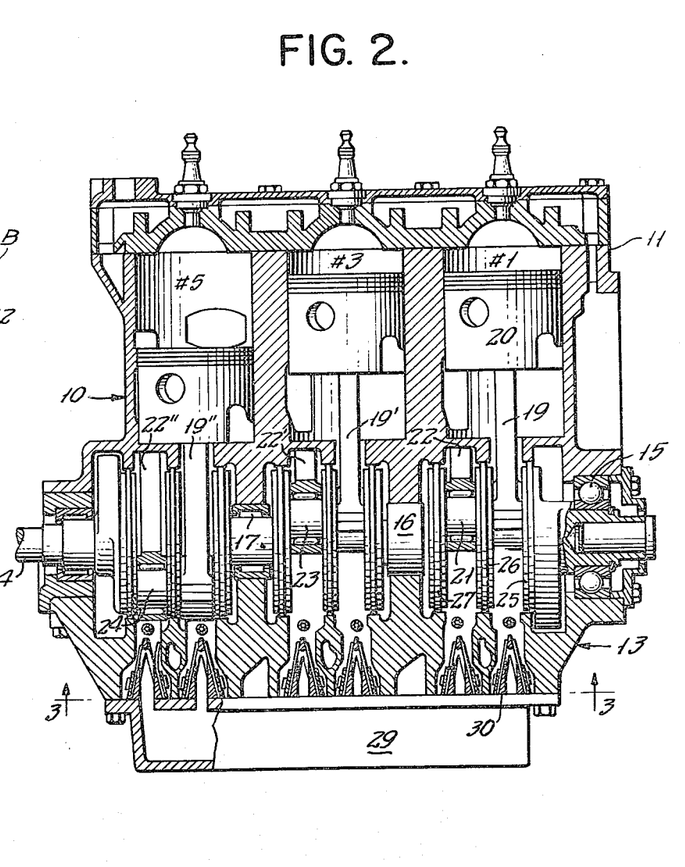
FIG. 2 is a longitudinal sectional view, taken at 2—2, through one of the cylinder banks of the engine of FIG. 1.
Figure 3:
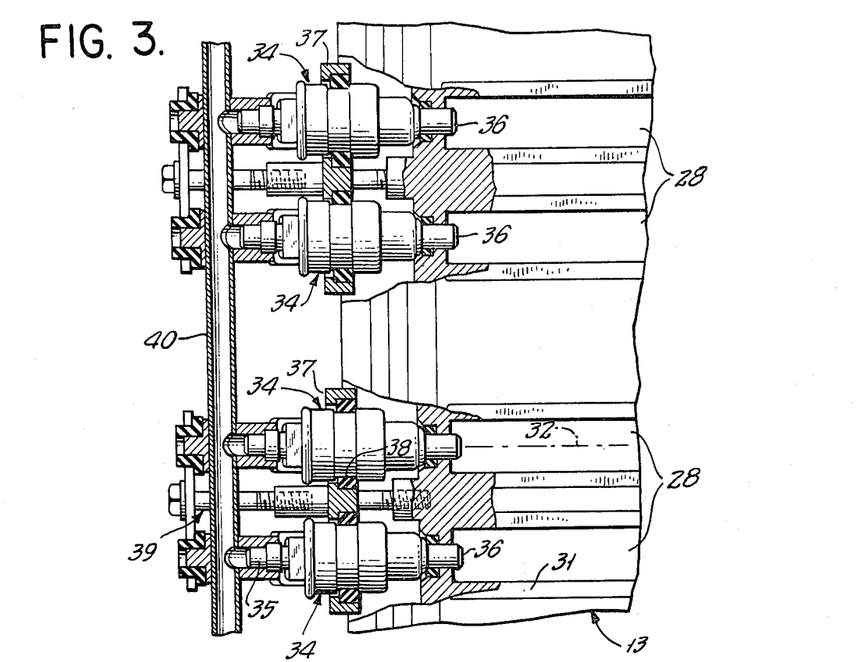
FIG. 3 is a fragmentary view, in partial section, at the plane 3—3 of FIG. 2.

Referring intially to FIGS. 1, 2 and 3, the invention is shown in application to a two-cycle V-6 engine having two banks A-B of three cylinders at 60-degrees angular separation, the sectional view of FIG. 2 being taken through the A bank, comprising cylinders #1, #3 and #5. All cylinders are formed in a single block 10, with cylinder heads 11-12 (and spark plugs) closing cylinders of the respective banks, and with fuel-air supply block 13 secured to the bottom of the engine block, at the plane of the axis of a crankshaft 14. A ball bearing 15 provides axially located rotary support for one end of crankshaft 14, and additional antifriction support is provided, at two-cylinder intervals, by needle bearings 16-17-18. The cylinders of the respective banks A-B are in spaced radial planes (i.e., staggered interlace) along the crankshaft axis, so that the connecting rod 19 for the piston 20 of cylinder #1 (bank A) may have longitudinally adjacent connection to the same crankshaft throw 21 as does the connecting rod 22 for cylinder #2 (not shown) of bank B, being the next-adjacent cylinder. Succeeding pairs of connecting rods, such as rods 19'-22' for adjacent cylinders #3 and #4, are similarly connected to a second crankshaft throw 23; and rods 19"-22" for adjacent cylinders #5 and #6 are connected to a third crankshaft throw 24, it being understood that the throws 21-23-24 are at successive 120-degree offsets about the crankshaft axis.

For isolation of a crankcase region unique to the piston of each cylinder, and to its crankshaft connection, seal discs, such as the discs 25-26 on opposite sides of rod 19 and discs 26-27 on opposite sides of rod 22, are carried for rotation with the crankshaft and have peripheral sealing action with opposed arcuate contours of crankcasewall formations in the respective engine blocks 10-13. And separate inlet passages 28 (see FIG. 3) to the respective crankcase regions are served by a single plenum 29, for manifolded supply of inlet air. A system of check valves, in the form of a reed-bank unique to each inlet passage 28, such as the reed-bank 30 at the cylinder #1 location, serves the crankcase region of each cylinder location, thereby assuring automatic closure of each crankcase region when its intake function ends. Such reed-banks are well-understood and therefore require no elaborate description. It suffices to explain that a reed-bank as at 30 comprises an elongate internally open prismatic frame of generally isoceles-triangular section, with base flanges to locate in seating-recess formations 31 (see FIG. 3) adjacent the sidewalls of each passage 28, at the plenum-connection end. The downstream end of each reed-bank 30 is essentially a line extending centrally of the long dimension of the generally rectangular cross-section of each passage 28, such line being suggested by a phantom line 32 for one of the passages 28 in FIG. 3; and check-valve action is via plural stiffly compliant reed members, clampd at one end near the base of the respective sloping sides of the triangular section, with openable coverage of discharge ports near the downstream ends of said sloping sides.

In accordance with a feature of the invention, fuel-injection is made unique to each crankcase region and at a locaton just downstream from the downstream end of each reed-bank 30. For this purpose, a separate solenoid-operated injector assembly 34 is mounted to one side of the intake block, for each crankcase region; such injector assemblies 34 are commercially available and therefore need not be described in detail. It suffices to state that each injector assembly 34 has a fuel-inlet end 35 and an injection nozzle 36 at its opposite end, the discharge axis of nozzle 36 being aligned preferably parallel to and slightly downstream from the downstream-end alignment 32 of the associated reed-bank 30. As seen in FIG. 3, a flanged member 37 is the means of applying clamp pressure via an elastomeric ring 38 for the loading of each injector assembly 34 in sealed seated position for the described direction of injection discharge. The same system of clamp rods 39 which loads member 37 into injector-retaining position also and analogously clamps the fuel-supply line 40 in common to the inlet end 35 of all injector assemblies 34, and it will be understood that fuel-pump means (not shown, but illustratively electric-motor driven) may assure at all times an elevated-pressure condition of fuel at the respective inlets 35; the elevated pressure should be well above any possible crankcase pressure (i.e., well above atmospheric pressure), and may suitably be in the range 30 to 50 psi, the same being regulated in such manner as to maintain a substantially constant differential pressure across the injectors. Also, the discharge-flow capacity of each injector assembly 34 should be such that even the circumstances of three injectors 34 simultaneously discharging will not materially reduce the fuel-supply pressure in line 40.

Figure 4:
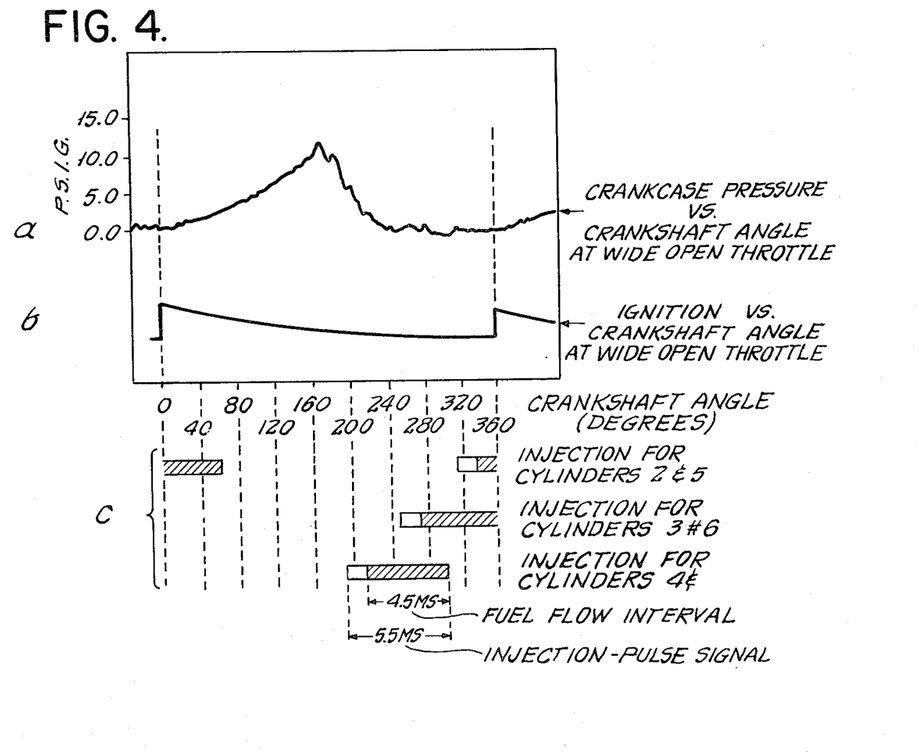
FIG. 4 is a graphical display of crankcase pressure as a function of crank angle for one of the cylinders of the engine of FIGS. 1 and 2, certain functions of the invention being also plotted to the same crank-angle function.

FIG. 4 is a graphical display to enable an understanding of the ignition function and the crankcase-pressure condition, as the same are typically related to crankshaft angle, for the case of any one of the cylinders of the described engine. Such an understanding is needed to appreciate another feature of the invention, having to do with fuel-injection economy and reliability. For consistency in referring all cylinder cycles to the same crankshaft cycle, the pressure and ignition curves of FIG. 4 will be stated to apply for cylinder #1.

For convenience in FIG. 4, ignition time for the displayed cylinder is taken as the origin for the 360-degree cycle of bottom-cylinder (i.e., crankcase, curve a) and top-cylinder (curve b) conditions, it being clear from the curve of crankcase pressure that pressure conditions are at their lowest, i.e., near atmospheric pressure (0 psig) over a substantial angular spread, from about the 200-degree crankshaft position (for the particular cylinder's piston), past the ignition position, and until about 60 degrees into the ensuing cycle. This represents a relatively generous fraction (namely, 220 degrees) of the total cycle, within which fraction crankcase pressure is close to atmospheric pressure and very definitely less than a 5 psi pressure differential. Thus, over this 220-degree fraction of crankshaft rotation, the pressure-differential which determines quantity of injected-fuel for a given injector-discharge interval will be fairly constant, the percent variation from constant being smaller the greater the fuel-supply pressure in line 40; e.g., for 50 psig supply pressure, the variation of this pressure difference is less than 10 percent. The crankcase pressure and the plenum pressure are substantially the same when the reeds are open. The invention utilizes the above observation as to substantially uniform injection-pressure differential, by providing injector assemblies 34 which, for the particular engine size are able to discharge the maximum volume of injected fuel within approximately 90 degrees of crankshaft rotation, at full-throttle, in approach to full speed. For the case of an engine with a top speed of 5500 rpm, 90 degrees of crankshaft rotation occurs in 4.5 milliseconds (MS); therefore, assuming that approximately one millisecond is required in which the injector solenoid overcomes armature and valve-member inertia, and in which fuel-discharge flow can build from zero to maximum, the maximum length of solenoid-energizing pulse needed by the engine will be 5.5 MS, corresponding to 110 degrees of crankshaft rotation at full speed.

With injector assemblies of the foregoing nature and capability, the invention contemplates economy of apparatus, by utilizing one set of injection-pulse signals (i.e., one square-wave pulse per crankshaft cycle) as the basic fuel-injection control for a first plurality of cylinders, and another set of injection-pulse signals as the basic fuel-injection control for a second plurality of cylinders. Thus, it is assured that the fuel-flow demands per crankshaft cycle will be two, with no overlap and with substantial dwell therebetween.

Figure 5:
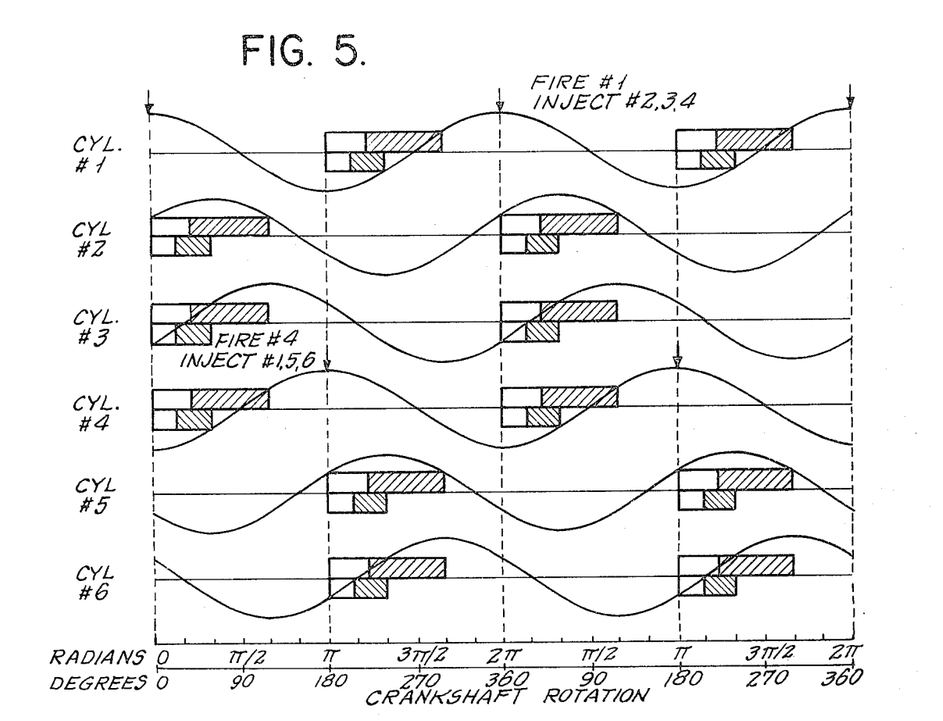
FIG. 5 is a graphical display of piston position as a function of crank angle, covering two full cycles of operation, for each of the six cylinders of the engine of FIGS. 1 and 2, with additional plots of fuel-injection timing, as applicable to the respective cylinders.

In the six-cylinder engine thus far described, and as more particularly depicted in FIG. 5, the first injection-pulse signals govern three injectors in unison, and are timed by the ignition signal for one cylinder; and the other injection-pulse signals govern the three remaining injectors in unison, and are timed by the ignition signal for the cylinder which is 180 degrees away, i.e., phase-opposite to the cylinder having the first ignition signal.

The bar diagrams at the curve c region of FIG. 4 show the timing of simultaneous injection pulses for cylinders #2, #3, and #4, each in relation to its own cycle of crankshaft rotation and for the case of pulse initiation by the ignition signal for cylinder #1; and if curves a and b of FIG. 4 are taken to apply for cylinder #b, then the bar diagrams of curve c similarly show the timing of injection pulses for cylinders #5, #6 and #1, as indicated by legend. In every case, the full 5.5 MS maximum bar length (injection-pulse duration) is displayed, involving an unshaded first millisecond within which above-noted inertial effects take place prior to the shaded region of full injected-fuel flow. At slower speeds, less fuel is needed and, therefore, the bar lengths will be shorter, in relation to crankshaft angle.

The foregoing discussion will become more clear by reference to FIG. 5, in which sinusoidal piston displacement is depicted at separate curves A, B, C ... F for each of the respective six cylinders. Ignition in cylinder #1, i.e., at the top-cylinder position for piston 20 in cylinder #1, is seen to determine the simultaneous injection of fuel into the respective crankcase regions of cylinders #2, #3, and #4; and, in 180-degree phase-interlace, i.e., at the top-cylinder instant of firing cylinder #4, simultaneous and like fuel-injection is made into the respective crankcase regions of cylinders #5, #6 and #1. In every case, an upper bar (first blank, then shaded) symbolizes a full-throttle condition, near full speed, while a lower bar (also first blank, then shaded) symbolizes a lesser-throttle or cruising condition. In all cases, fuel-injection is seen to occur well within the indicated substantially uniform low-pressure fraction of the operating cycle for the particular cylinder. In the case of cylinders #2 and #5, injection occurs while the associated piston is near its top-cylinder position, at which time curve a of FIG. 4 indicates substantially uniformaly low crankcase pressure. In the case of cylinders #3 and #6, injection occurs while the associated piston is in approach to its top-cylinder position, i.e., in the latter half of the phase in which fresh air is being drawn into the associated crankcase region. And in the case of cylinders #4 and #1, injection occurs while the associated piston is in the early half of its rise to top-cylinder position, i.e., also in the air-induction phase.

In said copending application, further illustrations of the principle of the above-described multiple-crankcase injection concept are given, for different two-cycle engine configurations, and reference is made to said application for detailed discussion thereof. Pulse-generator circuitry applicable in principle to said further illustrations, and specific to the six-cylinder embodiment of FIG. 5, is schematically shown in FIG. 6.

Figure 6:
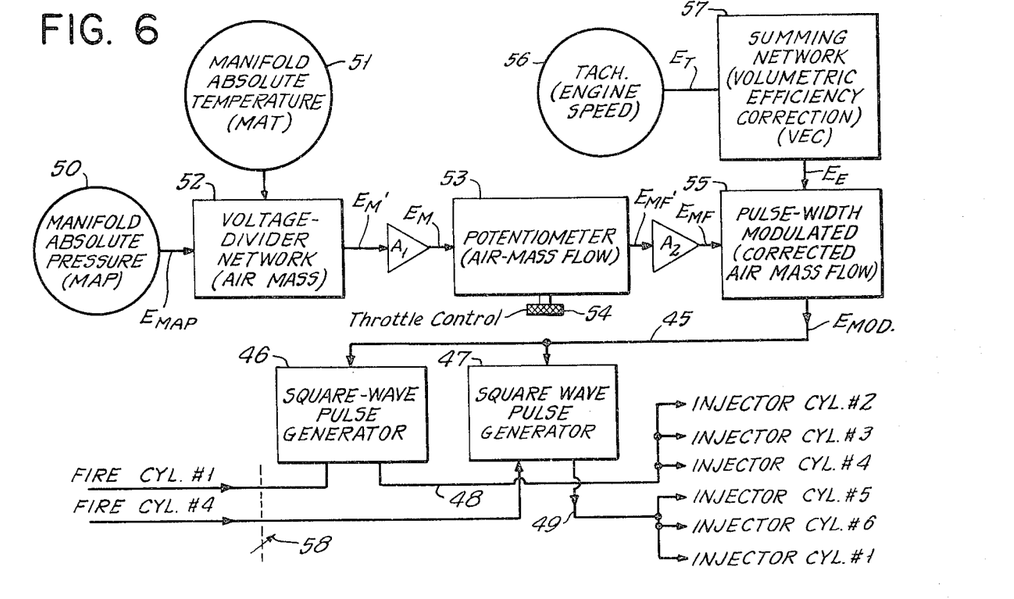
FIG. 6 is an electrical block diagram, schematically indicating components of fuel-injection control circuitry, applicable to various embodiments of the invention.

As shown, the circuit of FIG. 6 operates on various input parameters, in the form of analog voltages which reflect air-mass flow for the current engine speed, and a correction is made for volumetric efficiency of the particular engine, to arrive at a modulating-voltage output $E_{MOD.}$ in a line 45 to each of two like square-wave pulse generators 46-47. When triggered by an input pulse associated with spark-plug firing in cylinder #1, generator 46 initiates the creation of an output pulse in line 48 to the injector solenoids of the means 34 associated with the three cylinders #2, #3 and #4; and when similarly triggered by an input pulse associated with spark-plug firing in cylinder #4, generator 47 initiates the creation of an identical output pulse in line 49 to the injector solenoids of the means 34 associated with the remaining three cylinders #5, #6 and #1. Depending upon the magnitude of the modulating voltage $E_{MOD.}$ in line 45, the square-wave output at 48 will be of predetermined duration, and the square-wave output at 49 will always be of duration identical to that in line 48, it being understood that the predetermined duration is always a function of instantaneous engine-operating conditions.

More specifically, for the circuit shown, a first electrical sensor 50 of manifold absolute pressure (e.g., within plenum 29) is a source of a first voltage $E_{MAP}$ which is linearly related to such pressure, and a second electrical sensor 51 of manifold absolute temperature (also within plenum 29) may be a thermistor which is linearly related to such temperature, through a resistor network 52. The voltage $E_{MAP}$ is divided by the nework 52 to produce an output voltage $E_M'$ which is a linear function of instantaneous air-mass or density within plenum 29, i.e., at inlet of air to the engine. A first amplifier $A_1$ provides a corresponding output voltage $E_M$ at the high-impedance level needed for regulation-free application to the relatively low impedance of a potentiometer 53, having a selectively variable control that is symbolized by a throttle knob 54. The voltage output $E_{MF'}$ of potentiometer 53, reflects a "throttle"-positioned pick-off voltage and thus reflects instantaneous air-mass flow, for the instantaneous throttle (54) setting, and a second amplifier $A_2$ provides a corresponding output voltage $E_{MF}$ for regulation-free application to one of the voltage-multiplier inputs of the pulse-width modulator 55, which is the source of $E_{MOD.}$ already referred to.

The other voltage-multiplier input of modulator 55 receives an input voltage $E_E$ which is a function of engine speed and volumetric efficiency. More specifically, a tachometer 56 generates a voltage $E_T$ which is linearly related to engine speed (e.g., speed of crankshaft 14, or repetition rate of one of the spark plugs), and a summing network 57 operates upon the voltage $E_T$ and certain other factors (which may be empirically determined, and which reflect volumetric efficiency of the particular engine size and design) to develop the voltage $E_E$ for the multiplier of modulator 55. The modulator 55 will further be understood to include provision for a fixed voltage bias to be added to the product of voltages $E_{MF}$ and $E_E$, whereby the modulating-voltage output $E_{MOD.}$ additionally reflects a fixed allowance for above-noted inertial characteristics of the initial phase of exciting the particular fuel-injector assembly 34 which has been adopted for the engine.

To summarize, the output of modulator 55 will be seen as a voltage $E_{MOD.}$ which can be linearly related (at 46, and at 47) to the time duration of pulses initiated by the respective firing-pulse inputs to generators 46 and 47. Such duration is thus caused by the circuit of FIG. 6 to track the instantaneous solution of the expression:

$$\text{Pulse duration} = \left[\frac{MAP}{MAT}\right][(TP)(VEC)]k + T_I,$$

where:
  MAP is manifold absolute pressure,
  MAT is manifold absolute temperature,
  TP is throttle position (i.e., setting of knob 54),
  VEC is volumetric efficiency correction,
  k is a constant, and $T_I$ is the constant initiation time associated with the inertial character of the injector means 34.

More specifically, in terms of the voltages involved:

$$E_{MOD.} = \frac{k \cdot E_{MF}}{E_S - E_E} + E_{TI}$$

where:

$E_S$ is a predetermined function of regulated supply voltage used throughout the circuit, and $E_{TI}$ is a constant voltage which reflects the inertial character of injector means 34.

And it is observed that the above voltage expression for $E_{MOD.}$ assumes fidelity of the multiplication function at 55.

Figure 7:
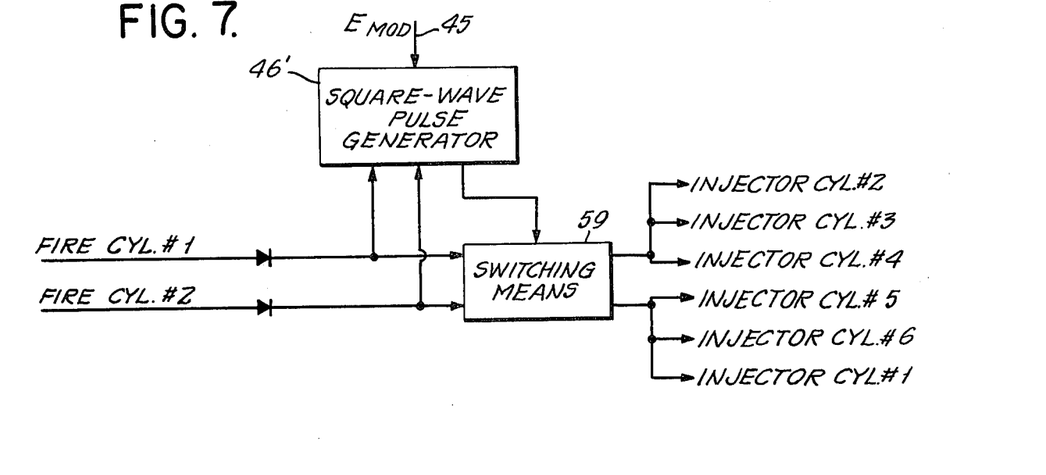
FIG. 7 is a fragmentary diagram to illustrate modification of a part of FIG. 6.

In the alternative or modification illustrated in FIG. 7, instead of using separate square-wave pulse generators as at 46-47 in FIG. 6, a single pulse generator 46' may be used, in conjunction with suitable switching means 59 as suggested by the diagram of FIG. 7. Since all square waves are of relatively small duration compared to the crankshaft cycle, even at full engine speed, there need be no ambiguity of commutating pulses to the correct injectors via suitable switching means 59, which in the case of two injection intervals per crankshaft rotation may be merely a bistable flip-flop of suitable capacity. Thus, in FIG. 7, the firing-pulse line for cylinder #1 may control switch means 59 to channel the square-wave output at 46' to the injectors for cylinders #2, #3 and #4, for the FIG. 5 situation, while the firing-pulse line for cylinder #4 controls switch means 59, to channel the square-wave output at 46' to the injectors for cylinders #5, #6 and #1, it being understood that diode devices may serve to isolate the respective pulse-initiating functions of the firing pulses, as suggested by sumbols in the drawing.

Figure 8:
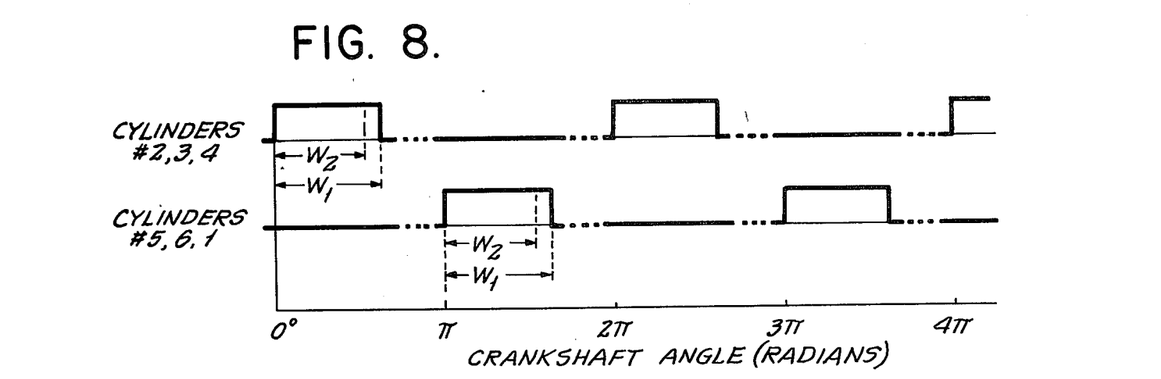
FIG. 8 is a graphical presentation to illustrate various functions of time, involved in operation of the FIG. 6 or FIG. 7 circuitry.

The square-wave pulses produced by generators 46-47 of FIG. 6 (or by the commutated single generator 46' of FIG. 7) are illustratively presented at upper and lower levels of FIG. 8, to the same scale of crankshaft angle, the latter being designated in terms of radians, at $\pi$ intervals (180°). For one running condition, all pulses may be determined by the respective generators 46-47 to be of width $W_1$, for which the solid-line envelopes apply. For another running condition, as at lesser throttle, the $E_{MOD.}$ voltage will have been generated at reduced amplitude, resulting in shorter pulse lengths $W_2$ in the respective output signals (to the injectors of the respective cylinder groups (#2, 3, 4, and #5, 6, 1)), and a dashed line for each pulse will be understood to identify the trailing edge of thus-reduced pulses.

Figure 9:
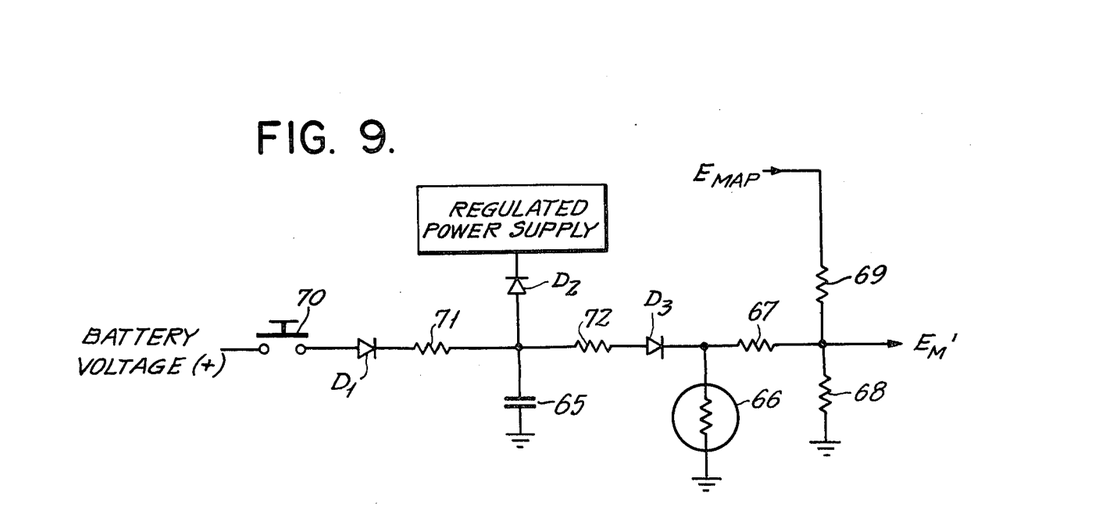
FIG. 9 is an electrical circuit diagram, schematically indicating more detail for some of the components of FIG. 6.

The circuit detail of FIG. 9 illustrates a cold-start enrichment feature of the circuit of FIG. 6, particularly suited to outboard-motor applications, whereby a pulse-widening bias is incorporated into the voltage $E_M'$ (and thus is also conveyed to the pulse-width modulator 55); specifically (a) the bias is applied to a leaky storage device 65 upon starting the engine, (b) the magnitude of the bias is inversely related to manifold absolute temperature ($E_{MAT}$), e.g., the colder the sensed temperature at start-up the greater the bias in the pulse-widening sense, and (c) the bias charge impressed on the leaky storage device degrades to zero in a matter of seconds, being a time function that is inversely dependent upon sensed temperature, once the bias charge has been applied to the storage device.

More specifically, air entering the engine is temperature-sensed by a bead thermistor 66, positioned in the inlet-air manifold (not shown). Thermistor 66 provides the electrical resistance in one arm of a bridge or voltage divider, the other arm of which is a resistor 67, say of 3000-ohm fixed resistance. The nature of thermistor (66) resistance is to vary non-linearly and inversely with temperature exposure, e.g., exhibiting resistances of 2000 ohms, 8000 ohms and 50,000 ohms at 60°, 25° and 0° C., respectively. Taken together, the elements 66-67 provide a temperature-responsive variable-resistance shunt across a fixed resistor 68, which forms part of the network 52 and across which the output voltage $E_M'$ is applied via amplifier A, to the Air-Mass Flow potentiometer 53, the voltage $E_{MAP}$ is supplied by a suitable pressure transducer (not shown) within the air-inlet manifold, and the voltage $E_{MAP}$ is applied across a larger fixed resistance 69 (e.g., 20,000 ohms) which is in series with resistance 68 (as shunted by the temperature-responsive voltage-dividing resistance 66-67); typically, $E_{MAP}$ will be 6 volts at wide-open throttle, and 4.5 or 5.0 volts at cruising, depending on whether the engine is of the 4-cycle or 2-cycle variety. In the normal course of events (i.e., a running engine), the voltage $E_M'$ is determined solely by the described components 66-67-68-69, electrically reflecting the desired evaluation of current manifold pressure and temperature.

Fuel enrichment is provided whenever the engine-starter switch 70 is engaged, battery voltage (e.g., 12.6 volts) then rapidly charging the storage device (capacitor 65) via protective diode $D_1$ and a dropping resistor 71 (e.g., 1000 ohms); at this time, due to limitation imposed by the regulated power supply (8 volts) and the drop across its diode $D_2$ connection to capacitor 65, a charge voltage of 8.6 volts develops across capacitor 65 and is applied at a reduced level via a large resistor 72 (e.g., 50,000 ohms) and protective diode $D_3$ for addition to the air-density signal $E_M'$ already described. When the starter switch 70 is disengaged, pulse-widening "enrichment" is slowly reduced to zero (e.g., in about 10 seconds) due to slow decay of the capacitor charge through the resistor network 72-66-67-68. It will be understood that the pulse-widening "enrichment" effect (at $E_M'$) of the charge at capacitor 65 will be an inverse function of the currently sensed-temperature condition of thermistor 66, namely, the colder the sensed temperature, the larger the resistance of thermistor 66 with respect to resistance at 67; and it will further be understood that the time required for the charge at 65 to leak to zero will also be an inverse-function of the temperature sensed at 66, i.e., the colder the sensed temperature, the longer it will take for the fuel-enriching charge at 65 to leak to zero.

Figure 10:
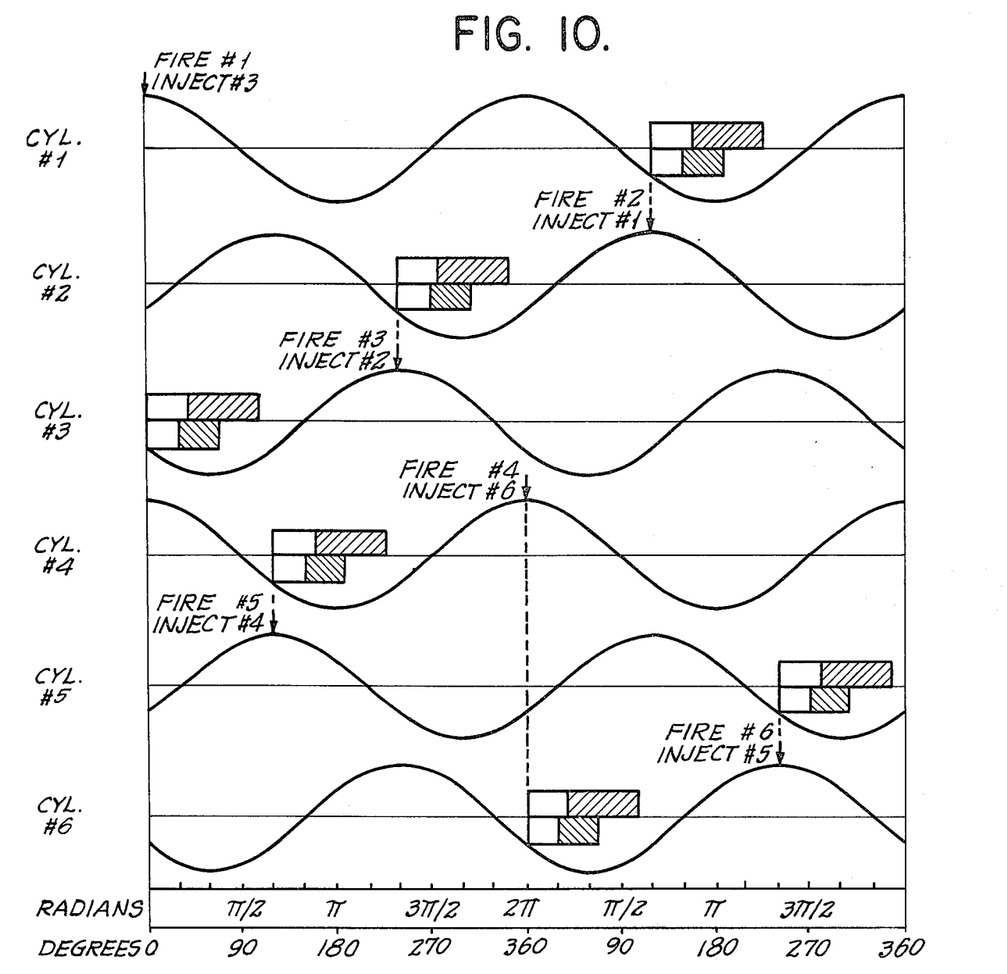
FIG. 10 is a diagram similar to FIG. 5, to illustrate application of the invention to a four-cycle engine.
Figure 11:
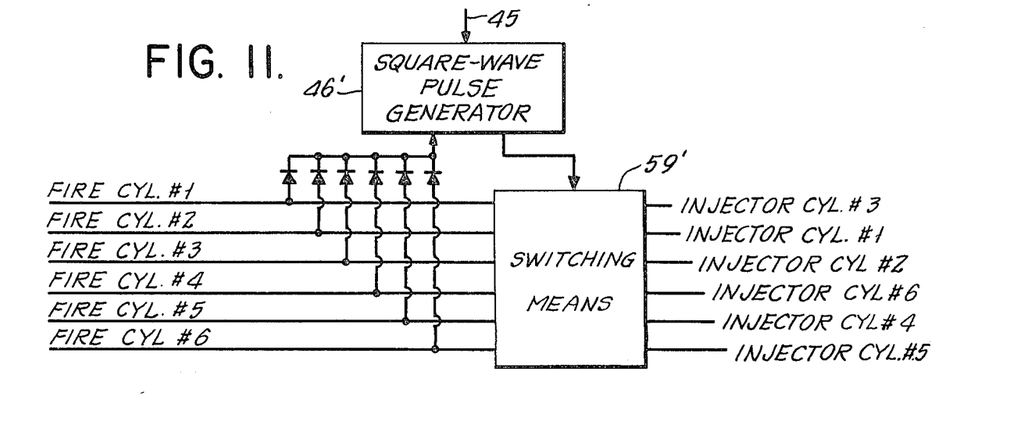
FIG. 11 is a circuit diagram similar to FIG. 7, but specific for application to the engine operation of FIG. 10.

FIGS. 10 and 11 illustrate use of described electronic-control unit with its width-modulated pulse output in the operation of a six-cylinder in-line outboard motor of the four-cycle variety. As shown in FIG. 10, the respective cylinders are fired in staggered-interlace succession, and a signal developed from the firing of each cylinder determines the pulse excitation of the solenoid-operated fuel-injector of a different cylinder, being in each case the cylinder which at the particular firing instant is undergoing least pressure change and is entering its air-fuel compression phase. In FIG. 10, the longer vs. shorter bar symbolism associated with each fuel injection will be understood to illustrate accelerating and cruising situations, as previously explained for the two-cycle engine of FIG. 5.

In FIG. 11, it is seen that the single square-wave pulse generator 46', as in FIG. 7, may respond by supplying the same size output pulse in response to each of the successive firing signals, the same being supplied to switching means 59' for appropriately commutated fuel-injector operation, consistent with legends applied to FIG. 10. Importantly, none of the fuel-injection signals ever overlap, even for full-throttle accelerating conditions, and even for the indicated fuel-enriched start-up transient program.

The described embodiments of the invention will be seen to have achieved all stated objects. In the particular case of outboard-motor application, i.e., in a marine context, the invention recognizes that ambient-temperature extremes are never as great as for automotive applications, so that engine-block temperature-control of choking (fuel-enrichment) at start-up is not necessary. Moreover, by relying upon charge-leakage as the means of automatically reducing the choke or full-enrichment, one avoids the hysteresis, relatively long time (in the order of minutes, rather than seconds) and other undesirable features so often encountered with operation which is predicated on the continuous tracking of engine-block temperature.

While the invention has been described in detail for illustrative embodiments, it will be understood that modification may be made without departure from the scope of the invention. For example, although all fuel-injection control pulses are shown to commence at substantially the instant of the input trigger pulse associated with a spark-plug firing, this need not be the case. In fact, ganged delay means (suggested by a single dashed line traversing the firing inputs to generators 46 and 47, or to generator 46') will be understood to indicate that upon manipulation of a single delay-control variable means 58, the arrival time of firing pulses to the respective input connections of such generators (46–47, or 46') may be selectively delayed, but always to the same extent (whether one or two generators), thus producing a selectively variable advance/retard function, as to the time of initiation of the square waves currently generated and supplied to all fuel-injectors.

What is claimed is:

1. Electronic pulse-generating means for timing the solenoid-excitation of a fuel-injection solenoid valve in an internal-combustion engine, said pulse-generating means including an input connection for pulse-initiating response to a predetermined angle event in a cycle of the engine, said pulse-generating means including a pulse-width modulating means and control circuit means having a control-signal connection to said modulating means for varying the pulse width generated by said pulse-generating means in accordance with a continuously evaluated plurality of electrically sensed parameters; said parameters specifically including inlet-air absolute temperature, inlet-air absolute pressure, throttle setting, and engine speed, and said parameters being normally evaluated for a predetermined fuel-air relation for normal running of the engine; said control-circuit means including a leaky storage device having a charging connection responsive only to engine-starting and in transient fuel-enriching relation with said pulse-generating means for transiently increasing pulse-width output of said pulse-generating means only upon engine-starting, said storage device including means for charging the same in inverse relation to sensed inlet-air absolute temperature the degree of fuel-enrichment decreasing to zero with charge leakage from said storage device at a rate dependent upon said sensed inlet-air absolute temperature, said decreasing rate being independent of engine starting versus engine running conditions, whereby upon cranking to start engine, the storage device is charged to an extent appropriate for the fuel-enriched starting requirement at the sensed inlet-air temperature, and, once started, the engine runs at progressively reducing enrichment until normal lean-mixture running condition is achieved upon full discharge of said storage device.

2. Pulse-generating means according to claim 1, in which said leaky storage device includes means varying the rate of leakage in inverse relation to sensed inlet-air absolute temperature.

3. Pulse-generating means according to claim 1, in which said pulse-generating means including a bead thermistor for providing an electrical resistance inversely related to sensed inlet-air absolute temperature, and in which said leaky storage device is a capacitor in charge-leaking connection relation to said thermistor.

4. Pulse-generating means according to claim 3, in which the charging connection includes a regulated power supply of lesser voltage output than the engine-starting battery voltage, and means including a starter switch contact and a dropping resistor for applying a battery-derived charging voltage to said capacitor, said power supply being diode-connected to said capacitor to assure a predetermined limit of charge on said capacitor for each application of charge to said capacitor.

5. Pulse-generating means according to claim 4, in which said charge-leaking connection includes a resistor of substantially greater resistance value than that of said dropping resistor.

6. Pulse-generating means according to claim 4, in which said charge-leaking connection includes a resistor of resistance value which is in the order of magnitude of that of said thermistor at the cold end of the requisite response range thereof.

7. Pulse-generating means according to claim 4, in which said charge-leaking connection includes a resistor and a protective diode.

8. In a fuel-injection control circuit wherein a modulated-width pulse is generated for solenoid excitation of a fuel-injector valve serving a cylinder of an internal-combustion engine, the improvement which comprises a leaky storage device connected in bias relation to said circuit to bias the modulated-width pulse in the pulse-widening sense to the extent that a charge remains at said storage device, and charging means for said storage device, said charging means being operative only upon engine starting and including means for sampling inlet-air absolute temperature and for supplying a charge of magnitude inversely proportional to the sampled temperature; whereby upon starting the engine, the fuel supplied by the injector valve is on a transiently enriched basis which inversely reflects sampled temperature, the engine-running transient of the enrichment being a direct function of the leakage characteristic of said storage device, said leakage of said storage device being at a rate dependent upon said sampled inlet-air absolute temperature, said leakage rate being independent of engine starting versus engine running conditions.

* * * * *